(12) United States Patent
Yueh et al.

(10) Patent No.: US 8,655,260 B2
(45) Date of Patent: Feb. 18, 2014

(54) SYSTEM AND METHOD FOR LEARNING CONCEPT MAP

(75) Inventors: Hsiu-Ping Yueh, Taipei (TW); Chih-Ting Lin, Taipei (TW); Shih-Kuan Hsu, Taipei (TW); Jo-Yi Huang, Taipei (TW); Jen-Jun Pan, Taipei (TW); Jun-Yu Chen, Taipei (TW); Yen-Liang Chou, Taipei (TW)

(73) Assignee: National Taiwan University, Taipei (TW)

( * ) Notice: Subject to any disclaimer, the term of this patent is extended or adjusted under 35 U.S.C. 154(b) by 435 days.

(21) Appl. No.: 12/788,054

(22) Filed: May 26, 2010

(65) Prior Publication Data

US 2011/0223575 A1     Sep. 15, 2011

(30) Foreign Application Priority Data

Mar. 10, 2010   (TW) .............................. 99106865 A

(51) Int. Cl.
  *G09B 3/00*   (2006.01)
(52) U.S. Cl.
  USPC ........... 434/351; 434/350; 434/276; 434/277; 434/298; 434/322
(58) Field of Classification Search
  USPC .................................. 434/350, 351, 322, 323
  See application file for complete search history.

(56) References Cited

U.S. PATENT DOCUMENTS

| | | | | |
|---|---|---|---|---|
| 4,034,486 | A * | 7/1977 | Mills ............................. | 434/208 |
| 5,386,507 | A * | 1/1995 | Teig et al. ..................... | 715/836 |
| 5,555,366 | A * | 9/1996 | Teig et al. ..................... | 711/169 |
| 6,192,215 | B1 * | 2/2001 | Wang ........................ | 434/307 R |
| 6,726,485 | B2 * | 4/2004 | Marcus et al. ................ | 434/156 |
| 6,755,655 | B2 * | 6/2004 | Marcus et al. ................ | 434/156 |
| 7,558,707 | B2 * | 7/2009 | Sherman et al. .................. | 703/2 |
| 2004/0197749 | A1 * | 10/2004 | Goldman et al. ............. | 434/172 |
| 2007/0021923 | A1 * | 1/2007 | Ishikawa et al. ............... | 702/19 |
| 2012/0122059 | A1 * | 5/2012 | Schweikardt et al. ........ | 434/118 |

\* cited by examiner

*Primary Examiner* — Robert J Utama
(74) *Attorney, Agent, or Firm* — Edwards Wildman Palmer LLP; Peter F. Corless; Steven M. Jensen

(57) ABSTRACT

A system for creating the learning organizational tool known as a concept map to thereby facilitate learning includes a manipulation-sensing device with a wireless data transceiver, an information integration platform, and a data processing device. The wireless manipulating-sensing device allows users to physically manipulate the concept map and then transmit/receive data related to the results of the physical manipulation via a wireless network. The wireless manipulation-sensing device includes a plurality of conceptual modules for recording data in the process of learning a concept map, a plurality of connecting modules for recording data of the connection relations between the conceptual modules, and a plurality of connecting wires connected between the plurality of conceptual modules and the plurality of connecting modules to form connection relations therebetween. The information integration platform receives the results of the physical manipulation transmitted from the conceptual modules to form concept map information by translation. The data processing device receives the concept map information formed by the information integration platform. In addition, a method for learning a concept map using the system described above is further provided.

12 Claims, 5 Drawing Sheets

SYSTEM AND METHOD FOR LEARNING CONCEPT MAP

CROSS-REFERENCES TO RELATED APPLICATIONS

This application claims under 35 U.S.C. §119(a) the benefit of Taiwanese Application No. 99106865 filed Mar. 10, 2010 the entire contents of which is incorporated herein by reference.

BACKGROUND OF THE INVENTION

1. Field of the Invention

The present invention relates to systems and methods for learning concept maps, and, more particularly, to a system and method whereby users learn a concept map with the aid of a system that senses manipulation of physical teaching aids and wirelessly transmits/receives the sensory data in network.

2. Description of the Prior Art

In learning theory, a concept map is a visualization tool for presenting different denotative concepts and the relation between different concepts in two dimensions. According to the constructive learning theory (constructivism), existing knowledge provides the basis for learning new knowledge, and thus a meaningful learning process must entail learners taking the initiative in integrating new concepts into their existing cognitive architecture. In the course of concept map production, learners not only have to understand a specific concept but also have to discern the connections between different concepts. The process of producing a concept map not only helps users realize their own inadequacy in the understanding of related concepts but also enables teachers to analyze the extent of learners' understanding of the related concepts. Hence, concept maps are widely applicable to software design, syntactic networks, system reasoning, and knowledge management. Accordingly, concept maps are important learning tools.

Concept map constructing tools in use usually include paper-based drawing, physical manipulation of tags (such as cards or stickers), and concept mapping via software (such as the packaged software Cmap or Mindjet), as well as work in teaching scenarios, such as teachers' instruction and demo sessions, student-based learning, and team-based learning. The advantages of learning by physical teaching aids tools are as follows: a concept map constructor (the learner/user) can come into contact with the constituent elements of a concept map, and, in the case of constructing a concept map by teamwork, members of the team can perceive and recognize the other members' facial expressions, words, and gestures in real time, and thus are more likely to concentrate on the current topic under discussion. However, the disadvantages of learning by physical teaching aids or tools are as follows: in the situation where it is necessary to revise, add, or remove connections between different concepts, the procedure of the revision, addition, or removal of connections involves drawing concept map elements anew, not to mention that it is impossible to provide audiovisual multimedia examples. Even worse, in practice, it is necessary to record the process of construction of a concept map in its entirety, which is time-consuming and detrimental to the learning process due to distraction.

Although the aforesaid commercially available software tools for learning a concept map allow learners to easily move elements in the concept map and record the process of constructing the concept map, they have drawbacks as follows: team members do not interact with each other during the learning process; and the software tools have a display unit configured for digital 2D presentation of a concept map but do not provide the 3D perception usually accompanied by physical manipulation. For example, digital presentation of a concept map that features voluminous content and intricate relations tends to impose limitation upon concepts embodied in the concept map and connections between the concepts. The aforesaid disadvantages and drawbacks hinder learning.

Accordingly, it could be quite useful to provide a way of learning a concept map by a combination of physical manipulation and digital recording/displaying, to provide a record of the course of construction of the concept map, enable digital presentation of the concept map constructed by physical manipulation, help learners learn the concept map, and improve on the prior art which discloses the sole use of teaching aids or software tool-based learning.

SUMMARY OF THE INVENTION

In light of the aforesaid drawbacks of the prior art, it is an objective of the present invention to provide a concept map learning system characterized by integration of physical manipulation of concept maps and software tools in a wireless network so as to improve on conventional concept map pedagogy and learning.

Another objective of the present invention is to provide a concept map learning method whereby a concept map learning process is delivered by physical teaching aids and displayed by digital presentation so as to streamline interaction between a learner and a teacher and enhance the concept map learning effect.

In order to achieve the above and other objectives, the present invention provides a system for learning a concept map. The system comprises: a manipulation-sensing device with wireless data transceiver for users to perform physical manipulation on the concept map and transmitting/receiving data related to results of the physical manipulation by a wireless network, the manipulation-sensing device with wireless data transceiver comprising: a plurality of conceptual modules for recording conceptual data related to learning the concept map and transceiving the data related to the physical manipulation by the wireless network; a plurality of connecting modules for recording data related to connection relations between the conceptual modules, the data related to connection relations at least comprising a plurality of conjunctions between the conceptual data; and a plurality of connecting wires for providing physical connections between the connecting modules and corresponding ones of the plurality of the conceptual modules so as for connection relations to be formed between the connecting modules and the corresponding conceptual modules; an information integration platform for receiving the results of the physical manipulation from the conceptual modules via the wireless network so as to form a concept map structure according to the results of the physical manipulation and translate the concept map structure to concept map information, wherein the results of the physical manipulation at least comprises the conceptual data, conjunctions, and the connection relation; and a data processing device for receiving the concept map information formed by the information integration platform. The information integration platform receives the results of the physical manipulation from the conceptual modules using the wireless network. Then, the information integration platform forms a concept map structure according to the results of the physical manipulation and translates the concept map structure to concept map information. The results of the physical manipulation comprises the conceptual data, conjunctions, and the connection relation. The data processing device receives the concept map information formed by the information integration platform.

In an embodiment of the present invention, the conceptual modules and the connecting module each have at least a connection port that can connect to a connecting wire so as for a connection relation to be formed between the conceptual modules via the connecting wire and the connecting module. The conceptual modules further comprises: a sensing unit for detecting a movement state of each of the conceptual modules; a storing unit for storing an ID, level, and number of connections of the conceptual modules and the conceptual data; a display unit for displaying the conceptual data; a wireless transceiver unit for transceiving the movement state and data stored in the storing unit; and a processing unit for driving the sensing unit, the storing unit, the display unit, and the wireless transceiver unit and processing the data stored in the storing unit, wherein the results of the physical manipulation further comprises the movement state of the conceptual modules.

In another embodiment of the present invention, the connecting module comprises two connection ports. A part of connection relation is formed between the connection ports and the conceptual modules by a connecting wire. The connecting module further comprises: a sensing unit for detecting a movement state of the connecting module; a storing unit for storing data related to the connection relation and an ID and connection direction of the connecting module; a display unit for displaying conjunctions denoted with the data related to connection relations; and a processing unit for driving the sensing unit, the storing unit, and the display unit of the connecting module and processing data stored in the storing unit of the connecting module, wherein the results of the physical manipulation further comprises a movement state of the connecting module.

The present invention further proposes a method for learning a concept map, by the aforesaid system for learning a concept map. The method comprises the steps of: (1) connecting a conceptual module and a connecting module together by a connecting wire, followed by recording a result of manipulation of the conceptual module and the connecting module, wherein the result of manipulation at least comprises conceptual data recorded by the conceptual module, connection relation data recorded by the connecting module, and data related to the connection relation formed between the conceptual modules and the connecting module; (2) sending the result of manipulation to an information integration platform by a wireless network; (3) receiving the result of manipulation from the conceptual module by the information integration platform via the wireless network, forming a concept map structure according to the result of manipulation, and translating the concept map structure to a concept map information; and (4) sending the concept map information to a data processing device, followed by displaying the concept map information on the data processing device.

In an embodiment of the present invention, step (1) further comprises moving the conceptual modules and/or the connecting module, and the result of manipulation further comprises the movement state of the conceptual modules and/or the connecting module.

In another embodiment of the present invention, step (1) further comprises sending by the connecting module the connection relation data thus recorded to the conceptual modules when the conceptual modules and the connecting module are connected.

In yet another embodiment of the present invention, step (3) further comprises translating the concept map structure to concept map information in an XML data format by the information integration platform so as to facilitate transmission thereof.

In a further embodiment of the present invention, the method further comprises, prior to step (1), writing the conceptual data and the connection relation data to the conceptual modules and the connecting module, respectively.

Unlike the prior art, the present invention provides a system for learning a concept map such that users can perform physical manipulation on a concept map learning process, transmit/receive concept map construction data by a wireless network, and display the concept map learning process by digital presentation. Unlike the prior art, the present invention further provides a method for learning a concept map to enable learners to manipulate physical teaching aids for providing physical contact during the concept map learning process and enable teachers to diagnose the vigorous interaction between learning team members.

DETAILED DESCRIPTION OF THE EMBODIMENTS

The present invention is herein illustrated with specific embodiments, so that one skilled in the pertinent art can easily understand other advantages and effects of the present invention from the disclosure of the invention. The present invention can also be implemented or applied according to other specific embodiments.

Figure 1:
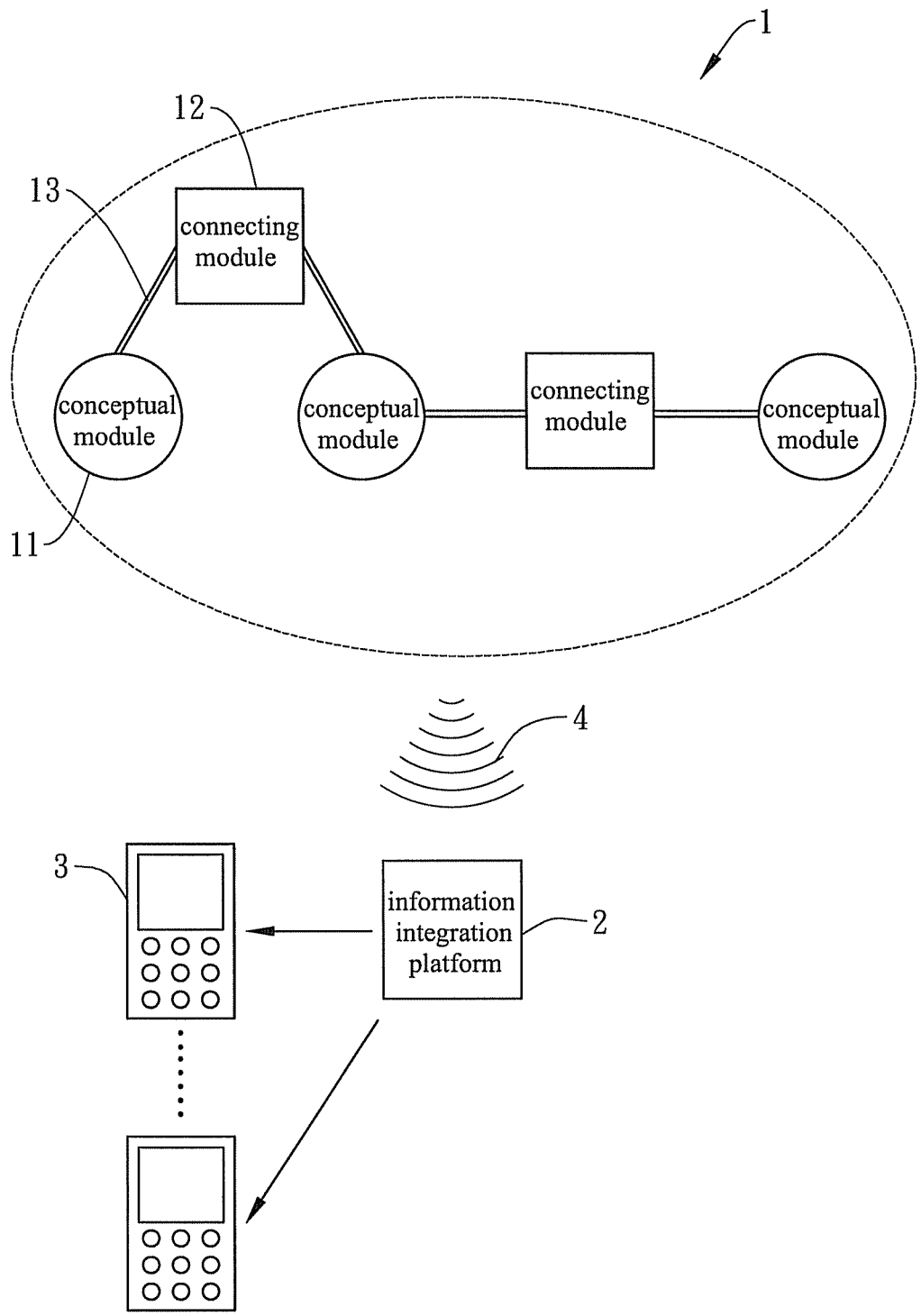
FIG. 1 is an architectural diagram of a system for learning a concept map according to the present invention.

Referring to FIG. 1, shown is an architectural view of a system for learning a concept map according to the present invention. As shown in FIG. 1, the present invention provides a system for learning a concept map such that users learn the concept map by a combination of physical teaching aids and wireless network transmission. The system for learning a concept map according to the present invention comprises: a manipulation-sensing device with wireless data transceiver 1 comprising a plurality of conceptual modules 11, a plurality of connecting modules 12, and a plurality of connecting wires 13; an information integration platform 2; and at least a data processing device 3. Data transmission between the manipulation-sensing device with wireless data transceiver 1 and the information integration platform 2 is effected by, for example, WiFi, Bluetooth, or infrared using a wireless network.

The manipulation-sensing device with wireless data transceiver 1 is configured to be physically manipulated by users so as for the users to learn a concept map and for data of results of the physical manipulation to be transmitted/received by a wireless network 4. In this embodiment, the manipulation-sensing device with wireless data transceiver 1 essentially comprises: the plurality of conceptual modules 11, a plurality of connecting modules 12, and a plurality of connecting wires 13. The conceptual modules 11 are configured to record conceptual data involved in the process of learning a concept map. Each of the conceptual modules 11 represents a learning concept. Data of manipulation result are transmitted and received by the wireless network 4.

The connecting modules 12 are configured to record data related to connection relations between the conceptual modules 11. The connection relation data at least comprise conjunctions between the conceptual data recorded by the conceptual modules 11.

The plurality of connecting wires 13 is configured to provide physical connections between the connecting modules 12 and the conceptual modules 11, each wire connecting a connecting module 12 to a conceptual module 11, so as for connection relations to be formed between the connecting modules 12 and the conceptual modules 11.

For example, given two said conceptual modules 11 configured to denote "water" and "ice", respectively, and a connecting module 12 configured to denote "condensation" (solidification), connecting the connecting module 12 to two said conceptual modules 11 via two connecting wires 13 creates a learning concept, that is, "water turns into ice by condensation/solidification." A plurality of said conceptual modules 11 and a plurality of said connecting modules 12 can be combined and connected together to enable the learning of a concept map.

The information integration platform 2 receives results of the physical manipulation from the conceptual modules 11 via the wireless network 4, forms a concept map structure according to the results of the physical manipulation, and translates the concept map structure to concept map information. The results of the physical manipulation at least comprises conceptual data, conjunctions, and the connection relation. The wireless network 4 sends the connection state of each of the conceptual modules 11 to the information integration platform 2. After receiving data of results of the manipulation related to the conceptual modules 11 and the connecting module 12, the information integration platform 2 converts the data of results of the manipulation into a concept map structure. Examples of the data of results of the manipulation include, but are not limited to, conceptual data of the conceptual modules 11, conjunctions of the connecting modules 12, and connection relation between the conceptual modules 11 and the connecting module 12. Furthermore, after receiving the data of results of the manipulation, the information integration platform 2 not only constructs a concept map structure according to the data of results of the manipulation but also translates the concept map structure into concept map information for subsequent delivery. The aforesaid translation is described later.

The data processing device 3 is configured to receive concept map information from the information integration platform 2 and display the concept map information thus received. Preferably, the data processing device 3 comprises a display unit. The information integration platform 2 sends the concept map information to the data processing device 3, and then the display unit displays the concept map information. The data transmission between the data processing device 3 and the information integration platform 2 is by a cable network or a wireless network. The data processing device 3 is, for example, a personal computer, a notebook computer, a panel computer, a portable mobile device, a PDA, a smart cell phone, a single-chip ARM-based computer, a microprocessor-equipped device, or any data-processing device.

In conclusion, the present invention provides a system for learning a concept map. The manipulation-sensing device with wireless data transceiver 1 of the system comprises a plurality of conceptual modules 11, a plurality of connecting modules 12, and a plurality of connecting wires 13 which together enable physical manipulation of a concept map. Related data of results of the manipulation are sent to the information integration platform 2 via the wireless network 4. Finally, the information integration platform 2 sends the related results of the manipulation to the data processing device 3 at the user end, and then the data processing device 3 displays a concept map in real-time, so as to enhance the learning effect.

Figure 2A:
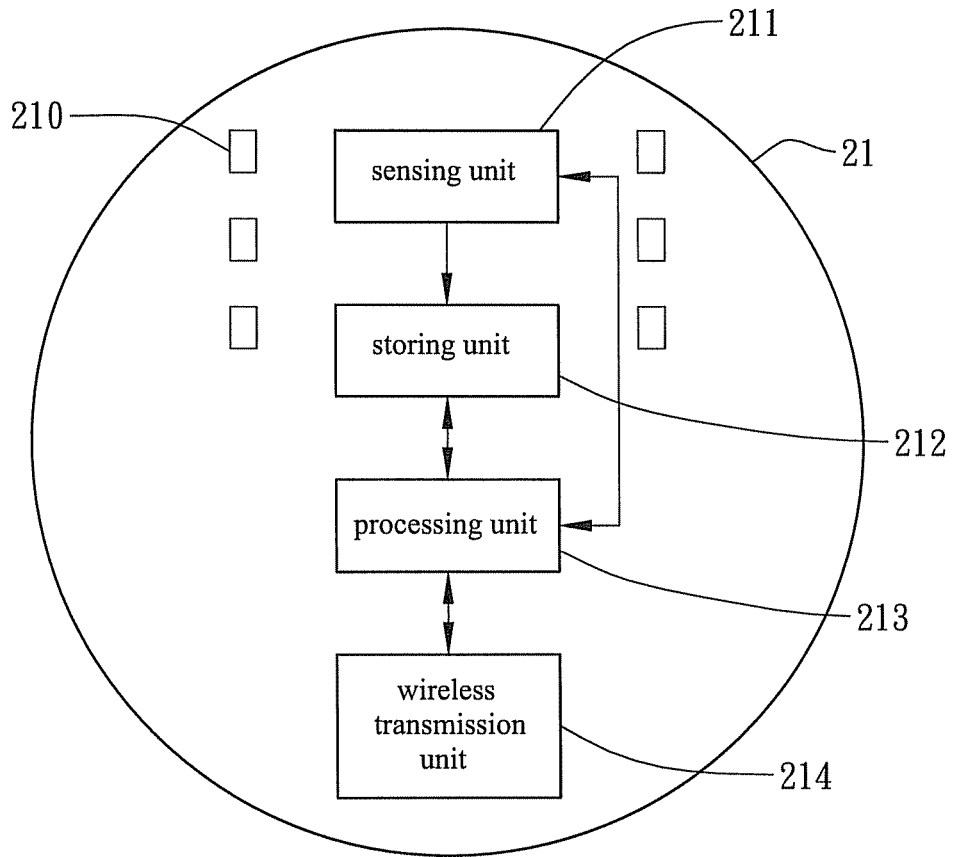
FIG. 2A is a block diagram of a conceptual module in the system for learning a concept map according to the present invention.

Referring to FIG. 2A, shown is a block diagram of a conceptual module in the system for learning a concept map according to the present invention. As shown in FIG. 2A, each conceptual module 21 has a plurality of connection ports 210, each port connectable to one of the connecting wires 13 (shown in FIG. 1), so as for a connection relation to be formed between the conceptual module 21 and another said conceptual module 21 via two connecting wires 13 and an intermediary connecting module 12 (as shown in FIG. 1). Preferably, in this embodiment, the conceptual module 21 further comprises a sensing unit 211, a storing unit 212, a processing unit 213, and a wireless transceiver unit 214. In this embodiment, the conceptual module 21 has a plurality of connection ports 210. In another embodiment, the number of the connection ports 210 is limited to one.

The sensing unit 211 is configured to detect the movement state of the conceptual module 21 so as to obtain the locus of movement of the conceptual module 21 and the final position thereof to facilitate subsequent construction and display of a concept map. The sensing unit 211, which measures displacement, can be equipped with various sensors configured for vibration measurement, temperature measurement, and/or chemical measurement, so as to provide more sensing-related data.

The storing unit 212 is configured to store the ID, level, and number of connections of the conceptual module 21 and/or conceptual data, but is not limited thereto. Each of the conceptual modules 21 is assigned an ID. The conceptual data in the conceptual module 21 denotes a learning concept. Each of the learning concepts is assigned a level (such that there are level relations between a plurality of learning concepts in a concept map). Hence, the storing unit 212 stores the conceptual data denoted with the conceptual module 21 ID, level of the conceptual data, number of connections generated by the conceptual module 21, and connection relation of the conceptual module 21.

The processing unit 213 is configured to drive the manipulation of the sensing unit 211, the storing unit 212, and the wireless transceiver unit 214, and process the data stored in the storing unit 212. The processing unit 213 further comprises results of the manipulation regarding the movement state generated by the conceptual module 21.

The wireless transceiver unit 214 transmits/receives the movement state of the sensing unit 211 and data stored in the storing unit 212.

Preferably, the conceptual module 21 selectively comprises a power supply unit (not shown) for supplying power, such as a lithium battery. The level of the conceptual module 21 is recorded in a digital way or, alternatively, is selectively switched between different levels by a multi-stage switch (not shown). The power supply unit or the multi-stage switch is attributable to the prior art pertaining to electronic circuitry and thus is not described in detail herein.

Figure 2B:
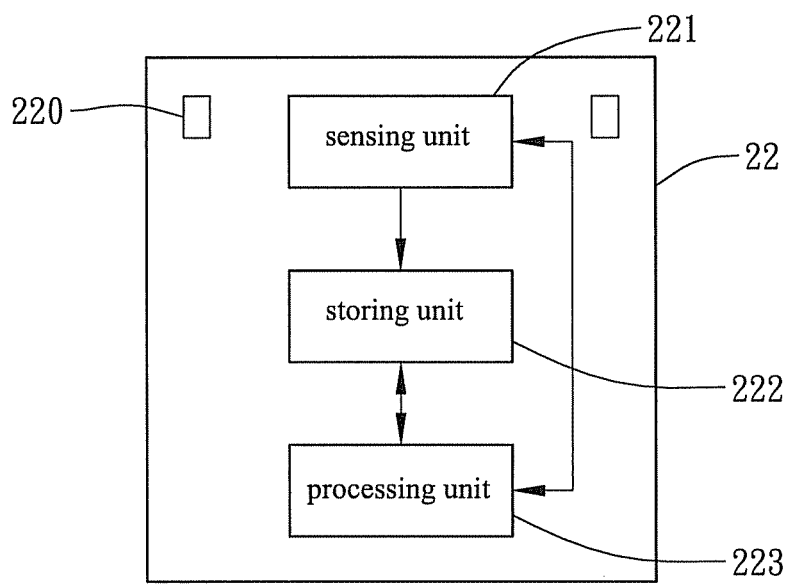
FIG. 2B is a block diagram of a connecting module in the system for learning a concept map according to the present invention.

Referring to FIG. 2B, shown is a block diagram of a connecting module in the system for learning a concept map according to the present invention. As shown in FIG. 2B, a connecting module 22 of a system for learning a concept map according to the present invention comprises at least two connection ports 220. The connection ports 220 permit a connection relation with the conceptual modules 21 via the connecting wires 13 shown in FIG. 1. Preferably, in this embodiment, the connecting module 22 further comprises a sensing unit 221, a storing unit 222, and a processing unit 223.

The sensing unit 221 is configured to detect the movement state of the connecting module 22 so as to obtain the locus of movement of the connecting module 22 and the final position thereof to facilitate subsequent construction and display of a concept map. The sensing unit 221 has the same structure as the sensing unit 211 shown in FIG. 2A and thus is not further described herein.

The storing unit 222 is configured to store information related to the connecting module 22. The information related to the connecting module 22 includes the ID and connection direction of the connecting module 22, data related to connection relations, and/or a connection relation, but is not limited thereto. Each of the connecting modules 22 is assigned an ID. A conjunction is denoted by the data related to connection relations in the connecting module 22. The connection direction determines what kind of connection relation exists between two said conceptual modules 21 and the connecting module 22. Hence, the storing unit 222 stores the ID of the connecting module 22, the conjunctions denoted, the connection directions generated, and/or the connection relation of the connecting module 22.

The processing unit 223 is configured to drive the manipulation of the sensing unit 221 and the storing unit 222 and process the data stored in the storing unit 222. The results of the manipulation further comprises the movement state generated by the connecting module 22.

For example, given a conceptual module assigned with ID A and configured to denote a learning concept "water", a conceptual module assigned with ID B and configured to denote a learning concept "ice", and a connecting module assigned with ID C and configured to denote a conjunction "condensation", the conceptual modules and the connecting module are connected together to be expressed as "A→C→B" which embodies related information, such as "connecting A to B" and "connection relation between A, B, and C", and, in so doing, the structure assumed by a concept map can be visualized according to the connection relation.

With the connecting module 22 connecting the conceptual modules 21 via the connecting wires 13, data stored in the storing unit 222 of the connecting module 22 comprises data related to connection relation created as a result of connection, and the data are sent to the conceptual module 21 via the connecting wire 13 before being sent to the information integration platform 2 by the wireless transceiver unit 214 of the conceptual module 21. The cable connection and thus data transmission between the conceptual module 21 and the connecting module 22 is effected by the connecting wire 13 shown in FIG. 1. Then, the wireless transceiver unit 214 of the conceptual module 21, a means to perform wireless transmission, sends the data to the information integration platform 2. Preferably, in other specific embodiments, the conceptual module 21 and the connecting module 22 move across a wireless sensing platform (not shown) provided in advance, so as for the position of the conceptual module 21 and the connecting module 22 to be tracked to thereby facilitate real-time display of the position of a concept map under construction.

Figure 3A:
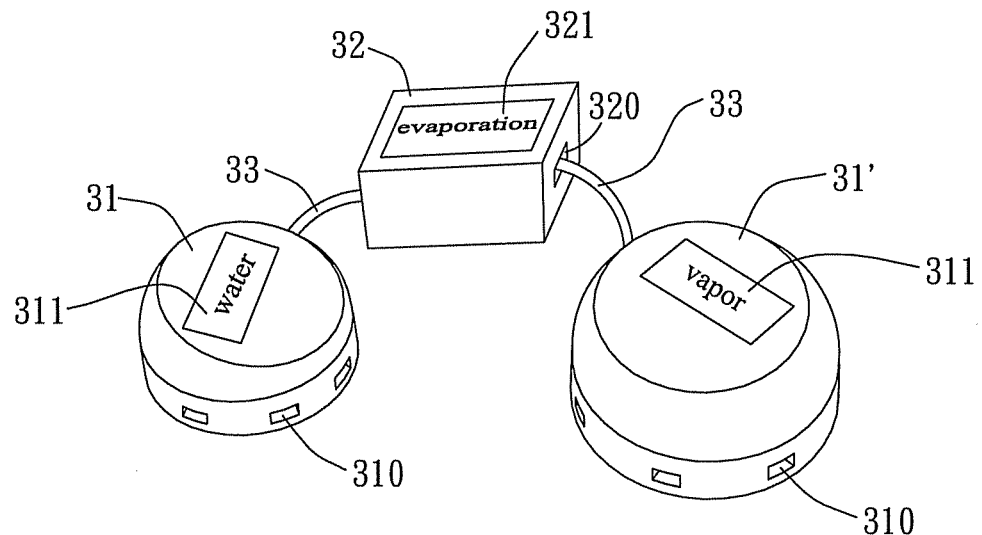
FIG. 3A is a perspective view of an application of conceptual modules and a connecting module according to the present invention.

Referring to FIG. 3A, there is shown a perspective view of an application of conceptual modules and a connecting module according to the present invention. In an embodiment illustrated with FIG. 3A, conceptual modules 31, 31' each comprise a plurality of connection ports 310, and a connecting module 32 comprises two connection ports 320. Each said connection ports 320 of the connecting module 32 is connected to one of the plurality of connection ports 310 of the conceptual modules 31, 31' via two connecting wires 33, respectively. Preferably, the conceptual modules 31, 31' each selectively comprise a display unit 311 for displaying conceptual data. The connecting module 32 selectively comprises a display unit 321 for displaying data related to connection relations. Hence, during the process of manipulation, users are able to see the learning concepts denoted by the conceptual modules 31, 31' and a conjunction denoted by the connecting module 32. Examples of the display units 311, 321 are light-emitting diode-based display units, liquid crystal display units, or liquid crystal display units with a touch-screen.

Figure 3B:
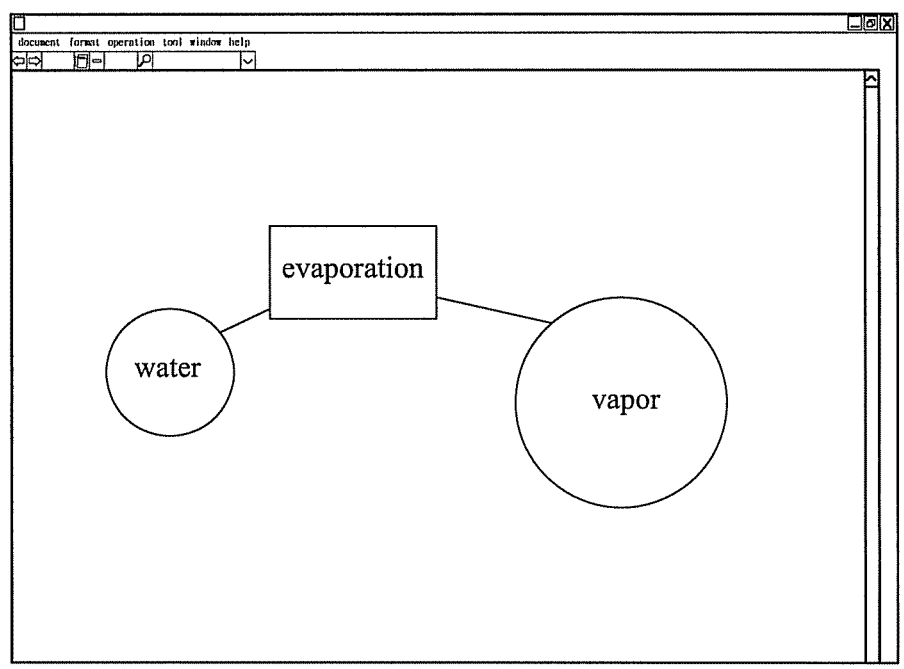
FIG. 3B is a screen shot of a concept map displayed on a data processing device according to the present invention.

Referring to FIG. 3B, shown is a screen shot of a concept map displayed on the data processing device 3 according to the present invention. As shown in FIG. 3B, a connection relation between the aforementioned exemplary conceptual modules and the connecting module is depicted as a concept map by the data processing device 3, using a software program. Referring to FIG. 3A, given the conceptual module 31 configured to denote the concept "water", the conceptual module 31' configured to denote the concept "vapor", and the connecting module 32 configured to denote the connection relation "evaporation", connecting the conceptual module 31 and the conceptual module 31' via the connecting module 32 allows the picture shown in FIG. 3B to be displayed on the display unit of data processing device 3 based on the information from the display units 311, 321; meanwhile, each of a plurality of users can use the display unit of the data processing device in his/her possession to display the combinational result of a concept map, that is, the conceptual relation formed by the combination of the concepts "water", "evaporation", and "vapor".

Figure 4:
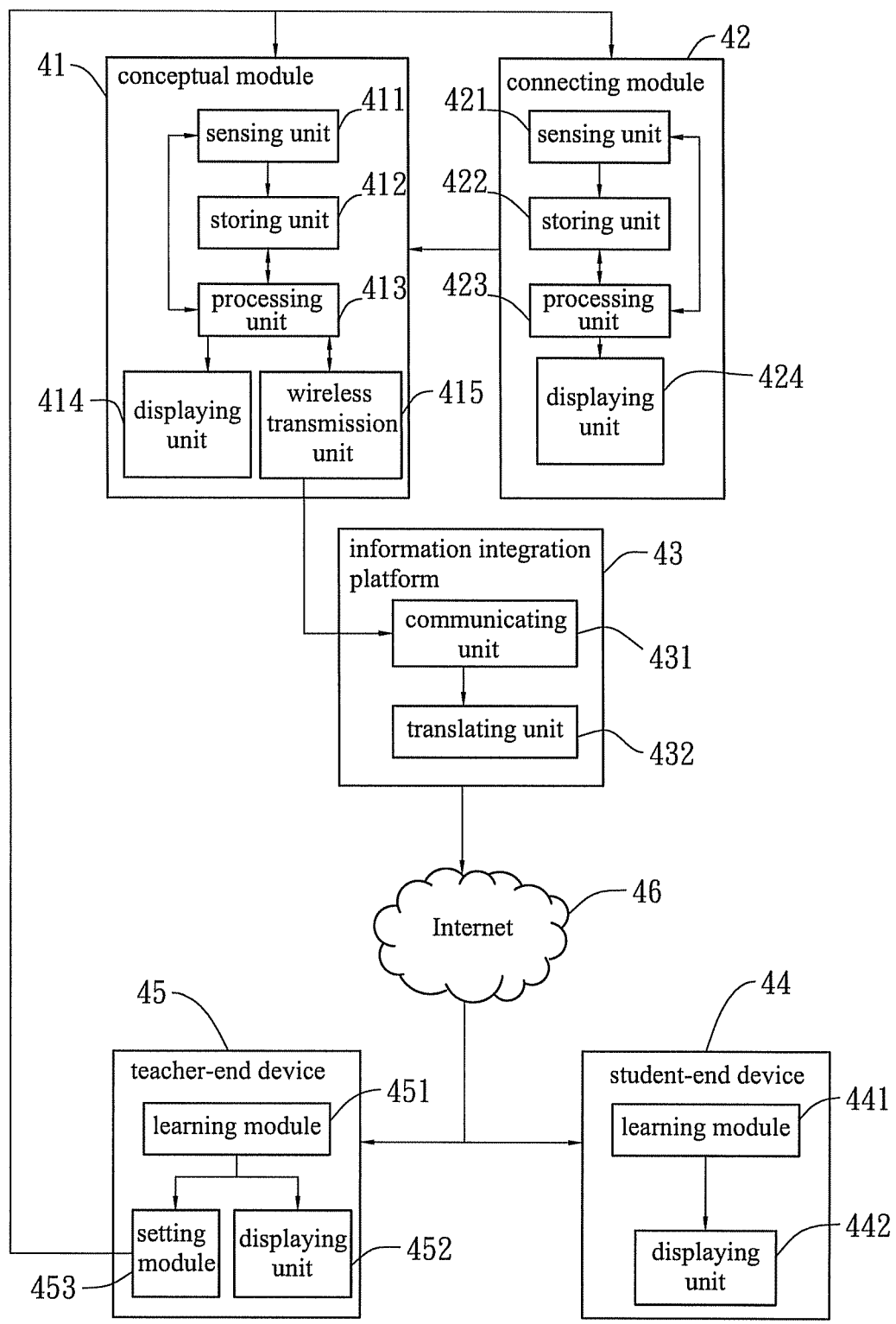
FIG. 4 is a block diagram of the system for learning a concept map in a specific embodiment according to the present invention.

Referring to FIG. 4, shown is a block diagram of the system for learning a concept map in a specific embodiment according to the present invention. As shown in FIG. 4, connection of a connecting module 42 and a conceptual module 41 is effected by a connecting wire (not shown). The connecting module 42 comprises a sensing unit 421, a storing unit 422, a processing unit 423, and a display unit 424. The sensing unit 421 senses the movement state of the connecting module 42. The storing unit 422 stores data related to the connecting module 42 and the connection relation thereof (if any). The processing unit 423 processes the aforesaid data. The display unit 424 displays the data related to connection relations (conjunctions) denoted by the connecting module 42. After the connecting module 42 and the conceptual module 41 are connected together, connection relation data generated by the connecting module 42 are sent to the conceptual module 41.

The conceptual module 41 comprises a sensing unit 411, a storing unit 412, a processing unit 413, a display unit 414, and a wireless transceiver unit 415. The sensing unit 411 senses the movement state of the conceptual module 41. The storing unit 412 stores data related to the conceptual module 41 and connection relation thereof. The processing unit 413 processes and acts upon the aforesaid data. The display unit 414 displays conceptual data denoted by the conceptual module

41. Finally, the wireless transceiver unit 415 sends related data to an information integration platform 43.

The information integration platform 43 comprises a communicating unit 431 and a translating unit 432. The communicating unit 431 receives data related to connection relations from the conceptual module 41 via the wireless transceiver unit 415. The data related to connection relations comprise data denoted by the connecting module 42 and the conceptual module 41, and results of the physical manipulation regarding the connection relation and movement states between individual modules. Upon receipt of the results of the physical manipulation, a concept map structure is formed from the connection relation according to the results of the physical manipulation. The translating unit 432 translates the concept map structure into concept map information for ease of storage and transmission. Preferably, a concept map structure is translated to concept map information in an XML data format so as to streamline data flow and facilitate the reading of the concept map data by different devices.

The information integration platform 43 receives and transmits data by a communication protocol or a transmission protocol, and preferably is equipped with various databases and application programs, such as the data processing device for recording a concept map learning process, user data, physical object data, or a concept map learning software used at a user end. In a specific embodiment, examples of the information integration platform 43 include a personal computer, a system platform, and a work server.

As mentioned earlier, the information integration platform 43 sends concept map information to the data processing device at a user end by a network connection and/or the Internet 46. In this embodiment, the data processing device consists of a student-end device 44 and a teacher-end device 45. The student-end device 44 essentially comprises a learning module 441 and a display unit 442. The learning module 441 is configured for the learning of a concept map. The display unit 442 displays the concept map in a digital and/or analog way. The teacher-end device 45 essentially comprises a learning module 451 and a display unit 452. The learning module 451 and the display unit 452 are similar to the learning module 441 and the display unit 442, respectively, in terms of functionality. Unlike the student-end device 44, the teacher-end device 45 further comprises a setting module 453. The setting module 453 sends conceptual data and data related to connection relations (conjunctions) to the conceptual module 41 and the connecting module 42, respectively. The setting module 453 transmits conceptual data and connection relation data by a USB port or preferably by wireless transmission. The setting module 453 is used to enter data to the conceptual module 41 and the connecting module 42 as needed. In so doing, the present invention dispenses with the complicated procedure of addition, removal, setting, or changing of objects by physical teaching aids, such as cards or stickers, to configure a concept map as taught by the prior art.

Figure 5:
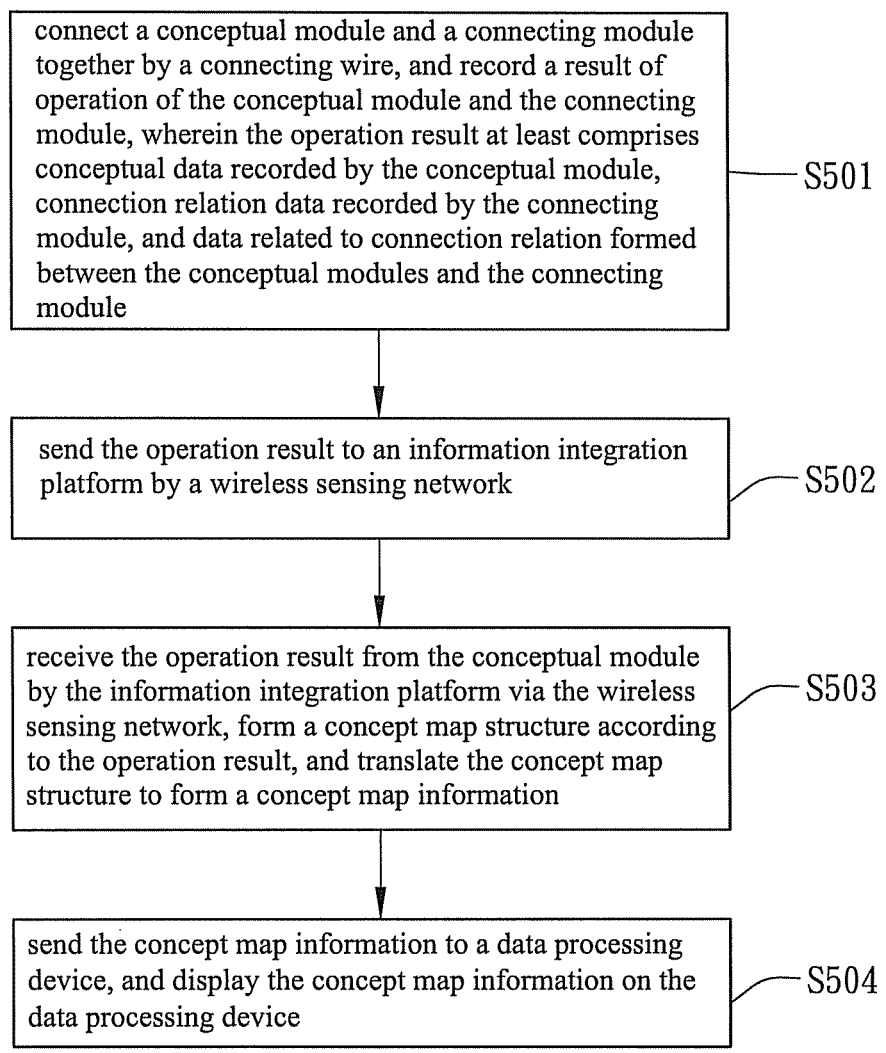
FIG. 5 is a flowchart of a method for learning a concept map according to the present invention.

Referring to FIG. 5, shown is a flow chart of a method for learning a concept map according to the present invention. As shown in FIG. 5, step S501 involves connecting a conceptual module and a connecting module together by a connecting wire, followed by recording a result of manipulation of the conceptual module and the connecting module. The results of the physical manipulation at least comprises conceptual data recorded by the conceptual module, connection relation data recorded by the connecting module, and data related to the connection relation formed between the conceptual modules and the connecting module. With physical manipulation, users can carry out combination and construction of a concept map by connecting the conceptual modules and connecting modules together with connecting wires; meanwhile, the conceptual module and the connecting module record data related to the movement process and the connection relation. Then proceed to step S502.

Step S502 involves sending the results of the manipulation to the information integration platform by a wireless network. The wireless transceiver unit of the conceptual module sends related data to the information integration platform by wireless transmission so as to enable centralized recording of users' learning processes, while movement and connection of the conceptual modules and the connecting modules are underway. Then proceed to step S503.

Step S503 involves receiving the results of the manipulation from the conceptual module by the information integration platform via the wireless network, forming a concept map structure according to the results of the manipulation, and translating the concept map structure to concept map information. In other words, the information integration platform processes the results of the manipulation received and combines the connection relation described in the results of the manipulation to construct a concept map structure, as depicted in FIG. 3B. In addition to recording the learning process and a concept map structure, the information integration platform translates the concept map structure to concept map information for ease of data transmission and interpretation to thereby facilitate subsequent transmission to other devices. Then proceed to step S504.

Step S504 involves sending concept map information to the data processing device and displaying the concept map information on the data processing device. The data processing device has an application program or software for receiving and reading the concept map information, thus allowing a plurality of users to read or record a concept map directly with the data processing device.

In another embodiment of the present invention, the step S501 further involves selectively moving a conceptual module and/or a connecting module, wherein the results of the manipulation further comprises the conceptual module and/or the movement state of the connecting module. The movement state of the connecting module and the conceptual module is part of the results of the manipulation and recorded and transmitted along with the information related to other modules.

In another embodiment of the present invention, the step S501 further involves selectively sending, by the connecting module, the connection information thus recorded to the conceptual module upon connection of the conceptual module and the connecting module. In other words, upon connection of the conceptual module and the connecting module, the connecting module sends the connection information to the conceptual module by a connecting wire for subsequent transmission and reception by the wireless transceiver unit of the conceptual module. The connection information comprises the ID of the connecting module, data related to connection relations, and/or connection state.

In yet another embodiment of the present invention, the step S503 further involves selectively translating by an information integration platform the concept map structure to concept map information in an XML data format for ease of transmission. As mentioned earlier, the information integration platform turns the results of the manipulation received into a concept map structure and translates the concept map structure to concept map information in an XML data format for ease of reading by other devices.

In a further embodiment of the present invention, the method further comprises, prior to the step S501, selectively writing the conceptual data and the data related to connection relations to the conceptual modules and the connecting module, respectively. The conceptual data and the data related to connection relations denoted by the conceptual modules and the connecting module, respectively, can be input as needed so as for users to make changes to the conceptual module or the connecting module.

The data processing device receives conceptual information and connection relation information to the conceptual module or the connecting module at the teacher end as required for subsequent display thereof.

Preferably, in step S504, a data processing device has a display unit for displaying the concept map information to be read by users. Hence, users (teachers or learners) can access concept map data, using the display unit of the data processing devices in their possession. In so doing, a concept map displayed by the data processing devices is readily comprehensible, easy to change, conducive to recordation, and therefore effective in improving users' learning performance.

In conclusion, the present invention provides a system and method for learning a concept map such that users learning a concept map can physically manipulate conceptual modules and connecting modules by means of physical contact and a high level of interaction so as to enable hands-on manipulation that is not attainable by conventional software-based teaching. Furthermore, transmitting data related to construction of a concept map by the wireless network does not affect users' manipulation but allows the process of learning a concept map and construction thereof to be recorded in real-time to thereby overcome drawbacks of the prior art, such as difficulty in modifying physical teaching and recordation. Last but not least, displaying a concept map in a digital way allows a plurality of users to learn a concept map and the structure thereof simultaneously. Hence, concept map learning, when undertaken by means of physical manipulation and digital recordation/display disclosed in the present invention, becomes comprehensive and conducive to elimination of the drawbacks of the monotonous conventional process of concept map learning.

The foregoing descriptions of the detailed embodiments are provided to illustrate and disclose the features and functions of the present invention and are not intended to be restrictive of the scope of the present invention. It should be understood by those in the art that many modifications and variations can be made according to the spirit and principles in the disclosure of the present invention and yet still fall within the scope of the invention as set forth in the appended claims.

What is claimed is:

1. A system for learning a concept map, comprising:
a manipulation-sensing device with a wireless data transceiver for users to perform physical manipulation of the concept map and transmitting and receiving data related to results of the physical manipulation via a wireless network, the manipulation-sensing device with the wireless data transceiver comprising:
a plurality of conceptual modules for recording conceptual data related to learning the concept map and transmitting the data related to the physical manipulation via the wireless network, wherein each of the conceptual modules comprises a display unit for displaying the conceptual data;
a plurality of connecting modules for recording data related to connection relations between the plurality of conceptual modules, the data related to connection relations at least comprising a plurality of conjunctions between the conceptual data, wherein each of the connecting modules further comprises a display unit for displaying the data related to the connection relations; and
a plurality of connecting wires for providing physical connections between the plurality of connecting modules and corresponding ones of the plurality of conceptual modules so as for connection relations to be formed between the plurality of connecting modules and the plurality of conceptual modules;
an information integration platform for receiving the results of the physical manipulation from the conceptual modules via the wireless network so as to form a concept map structure according to the results of the physical manipulation and translate the concept map structure to concept map information, wherein the results of the physical manipulation at least comprise the conceptual data, conjunctions, and connection relations; and
a data processing device for receiving the concept map information formed by the information integration platform, wherein the data processing device comprises a setting module for sending the conceptual data and the conjunctions to the plurality of conceptual modules and the plurality of connecting modules, respectively.

2. The system of claim 1, wherein the plurality of conceptual modules and the plurality of connecting modules each have at least a connection port connectable to one of the connecting wires so as for the connection relations to be formed between the conceptual modules via the connecting wires and the connecting modules, the conceptual modules each comprising:
a sensing unit for detecting a movement state of each of the conceptual modules;
a storing unit for storing an ID, level, and number of connections of the conceptual modules and the conceptual data;
a wireless transceiver unit for transmitting and receiving the movement state and data stored in the storing unit; and
a processing unit for driving the sensing unit, the storing unit, the display unit, and the wireless transceiver unit and processing the data stored in the storing unit,
wherein the results of the physical manipulation further comprise the movement state of the conceptual modules.

3. The system of claim 1, wherein each of the plurality of connecting modules comprises two connection ports so as for a connection relation to be formed between the connection ports and the conceptual modules via connecting wires, each of the plurality of connecting modules further comprising:
a sensing unit for detecting the movement state of the connecting module;
a storing unit for storing data related to the connection relations and an ID and connection direction of the connecting module; and
a processing unit for driving the sensing unit, the storing unit, and the display unit of the connecting module and processing the data stored in the storing unit of the connecting module,
wherein results of the physical manipulation further comprises the movement state of the connecting module.

4. The system of claim 3, wherein the data stored in the storing unit of the connecting module is transmitted to the conceptual modules by the connecting wires.

5. The system of claim 2, wherein the information integration platform further comprises a communicating unit for receiving the results of the physical manipulation from the wireless transceiver unit of each of the conceptual modules.

6. The system of claim 1, wherein the information integration platform further comprises a translating unit for translating the concept map structure to the concept map information in an XML data format.

7. The system of claim 1, wherein the data processing device further comprises a display unit for displaying the concept map information.

8. A method for learning a concept map via a system for learning the concept map, in which the system comprises:
   a manipulation-sensing device with a wireless data transceiver for users to perform physical manipulation of the concept map and transmitting and receiving data related to results of the physical manipulation via a wireless network, the manipulation-sensing device with the wireless data transceiver comprising:
   a plurality of conceptual modules for recording conceptual data related to learning the concept map and transmitting the data related to the physical manipulation via the wireless network, wherein each of the conceptual modules comprises a display unit for displaying the conceptual data;
   a plurality of connecting modules for recording data related to connection relations between the plurality of conceptual modules, the data related to connection relations at least comprising a plurality of conjunctions between the conceptual data wherein each of the connecting modules further comprises a display unit for displaying the data related to the connection relations; and
   a plurality of connecting wires for providing physical connections between the plurality of connecting modules and corresponding ones of the plurality of conceptual modules so as for connection relations to be formed between the plurality of connecting modules and the plurality of conceptual modules;
   an information integration platform for receiving the results of the physical manipulation from the conceptual modules via the wireless network so as to form a concept map structure according to the results of the physical manipulation and translate the concept map structure to concept map information, wherein the results of the physical manipulation at least comprise the conceptual data, conjunctions, and connection relations; and
   a data processing device for receiving the concept map information formed by the information integration platform, wherein the data processing device comprises a setting module for sending the conceptual data and the conjunctions to the plurality of conceptual modules and the plurality of connecting modules, respectively, the method comprising the steps of:

(1) connecting a conceptual module and a connecting module together by a connecting wire, followed by recording a result of manipulation of the conceptual module and the connecting module, wherein the result of manipulation at least comprises conceptual data recorded by the conceptual module, connection relation data recorded by the connecting module, and data related to the connection relation formed between the conceptual modules and the connecting module;

(2) sending the result of manipulation to an information integration platform by a wireless network;

(3) receiving the result of manipulation from the conceptual module by the information integration platform via the wireless network, forming a concept map structure according to the result of manipulation, and translating the concept map structure to concept map information;

(4) sending the concept map information to a data processing device, followed by displaying the concept map information on the data processing device, and writing the conceptual data and the connection relation data, by the data processing device, to the conceptual module and the connecting module, respectively, prior to step (1).

9. The method of claim 8, wherein step (1) further comprises moving the conceptual module or the connecting module, and the result of manipulation further comprises the movement states of the conceptual modules or the connecting modules.

10. The method of claim 8, wherein step (1) further comprises sending by the connecting modules the connection relation data thus recorded to the conceptual modules when the conceptual module and the connecting module are connected.

11. The method of claim 8, wherein step (3) further comprises translating the concept map structure to concept map information in an XML data format by the information integration platform.

12. The method of claim 8, wherein step (4) further comprises presenting the concept map information in a digital or analog way by the data processing device.

* * * * *